UNITED STATES PATENT OFFICE.

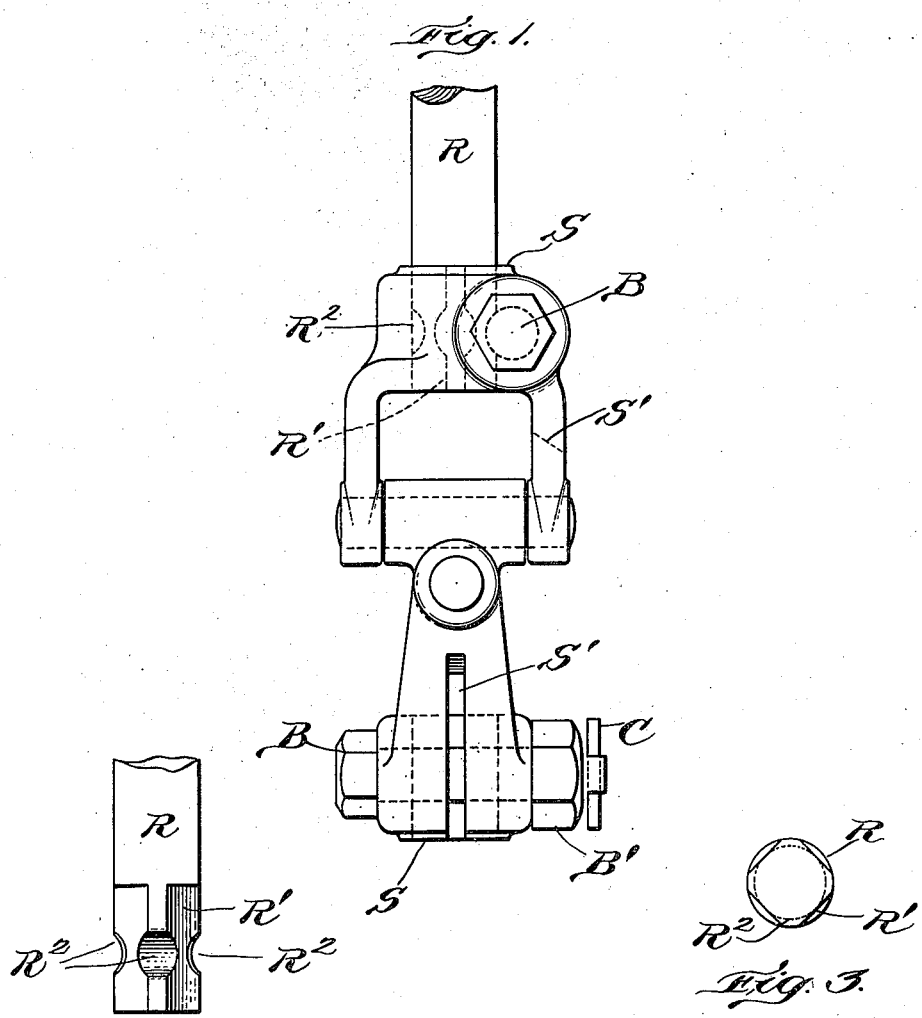

BELVIN T. WILLISTON, OF SOMERVILLE, MASSACHUSETTS, ASSIGNOR TO THE UNITED INJECTOR COMPANY, OF NEW YORK, N. Y., A CORPORATION OF NEW YORK.

TORSION-ROD FASTENING.

1,121,962.  Specification of Letters Patent.  Patented Dec. 22, 1914.

Application filed November 6, 1913. Serial No. 799,590.

*To all whom it may concern:*

Be it known that I, BELVIN T. WILLISTON, a citizen of the United States, and resident of Somerville, in the county of Middlesex and State of Massachusetts, have invented new and useful Improvements in Torsion-Rod Fastenings, of which the following is a specification.

My invention relates to fastenings for torsion rods, and has for its object the construction of such a fastening which shall be simple, secure and susceptible of easy adjustment.

In the drawings hereto annexed which illustrate my invention, Figure 1 shows in elevation the assembled torsion rod fastening; Fig. 2 shows in elevation the end of a torsion rod; and Fig. 3 is an end view of the torsion rod.

In Fig. 1 two precisely similar socket members designated by S are shown as jointed together to form a universal joint. Each of these socket members is provided with a polygonal, for instance, a square opening in its end, said opening being adapted to receive and hold the polygonal end R′ of the torsion rod R. Each of the socket members is slotted as at S′ so as to enable the binding bolt B to pinch the sides of the polygonal opening against the correspondingly polygonal end R′ of the torsion rod R. The binding bolt B passes across the slot S′ and intersects the polygonal opening, preferably crossing one of the internal dihedral angles of the said opening.

The torsion rod R has its ends squared as at R′ (see Fig. 2) and this squared end is peripherally grooved as at $R^2$ so as to form a number of notches in the edges of the polygonal end, this being shown as a squared end in the figures. This squared end R′ fits a similarly squared opening in the socket member S, and one of the notches $R^2$ is engaged by the binding bolt B, so that while the pinch produced by the binding bolt B holds the torsion rod securely against rattling the rod is further positively held against longitudinal slipping in the socket by the bolt B which thus performs the two functions of a binding bolt and a key or "dutchman." The binding bolt B is preferably a screw bolt engaging a nut B′. The bolt may project through the nut B′ and be perforated to receive a cotter pin C for the sake of complete security.

While the intention is to maintain the junction between the rod R and the socket piece S firm and free from any play or backlash, nevertheless should the bolt B become loose for any reason, the squared end of the rod R fitting its corresponding opening in the socket piece S will enable the rod to perform its function as a torsion rod, while the engagement of the bolt B with a notch $R^2$ will effectually prevent the rod R from slipping longitudinally. If for any reason it be desired to change the adjustment of the torsion rod R, this can be done by withdrawing the bolt B and the rod R, turning the latter a quarter turn and replacing it in the opening, when another of the notches $R^2$ will be in place to engage the bolt B when the latter is inserted.

What I claim and desire to secure by Letters Patent is:

1. In a torsion rod fastening, the combination of a torsion rod regularly polygonal at its end, a socket member with a corresponding regular polygonal opening, said socket member being slotted at one side of the opening, and a binding bolt crossing the slot and intersecting the polygonal opening, the polygonal end of the torsion rod being notched similarly across each polygonal angle, each notch being adapted to co-act with said binding bolt.

2. In a torsion rod fastening, the combination of a torsion rod regularly polygonal at its end, said polygonal end provided with a plurality of peripheral notches corresponding in number with the plurality of sides of said end, a socket member with a corresponding regular polygonal opening, said socket member being slotted at one side of its opening, and a binding bolt crossing the slot and intersecting the polygonal opening, and adapted to engage any of the peripheral notches in the end.

Signed by me at Boston, Massachusetts, this fourth day of November 1913.

BELVIN T. WILLISTON.

Witnesses:
ODIN ROBERTS,
G. WRIGHT ARNOLD.